(12) United States Patent
Selan

(10) Patent No.: US 10,852,815 B2
(45) Date of Patent: Dec. 1, 2020

(54) DISPLAY SYSTEM WITH DYNAMIC LIGHT OUTPUT ADJUSTMENT FOR MAINTAINING CONSTANT BRIGHTNESS

(71) Applicant: Valve Corporation, Bellevue, WA (US)

(72) Inventor: Jeremy Adam Selan, Kirkland, WA (US)

(73) Assignee: Valve Corporation, Bellevue, WA (US)

( * ) Notice: Subject to any disclaimer, the term of this patent is extended or adjusted under 35 U.S.C. 154(b) by 0 days.

(21) Appl. No.: 16/399,804

(22) Filed: Apr. 30, 2019

(65) Prior Publication Data

US 2020/0348750 A1 Nov. 5, 2020

(51) Int. Cl.
*G06F 3/01* (2006.01)
*G02B 27/01* (2006.01)
*H04N 13/332* (2018.01)

(52) U.S. Cl.
CPC ........... *G06F 3/012* (2013.01); *G02B 27/017* (2013.01); *H04N 13/332* (2018.05); *G09G 2310/0264* (2013.01)

(58) Field of Classification Search
CPC ...... G02B 27/017; H04N 13/332; G06F 3/012
See application file for complete search history.

(56) References Cited

U.S. PATENT DOCUMENTS

| 2014/0198093 A1* | 7/2014 | Nambi | G06T 1/20 345/212 |
| 2016/0196802 A1* | 7/2016 | Nho | G09G 3/20 345/212 |
| 2017/0032729 A1* | 2/2017 | Moldvai | H05B 45/24 |
| 2018/0040285 A1* | 2/2018 | Sakurai | G09G 3/3648 |
| 2018/0114566 A1* | 4/2018 | Aoyama | G02B 27/017 |
| 2018/0365882 A1* | 12/2018 | Croxford | G06T 15/10 |
| 2019/0244572 A1* | 8/2019 | Le | G09G 3/3406 |

OTHER PUBLICATIONS

The PCT Search Report and Written Opinion dated May 22, 2020 for PCT Application No. PCT/US2020/030300, 8 pages.

* cited by examiner

*Primary Examiner* — Lixi C Simpson
(74) *Attorney, Agent, or Firm* — Lee & Hayes, P.C.

(57) ABSTRACT

Light output of a display can be dynamically adjusted on-the-fly. When implemented on a low-persistence display that supports a variable refresh rate, this dynamic light output adjustment maintains a constant brightness over a series of frames to eliminate flickering of the display. When pixel data of a given frame is output to a frame buffer for presenting an image on the display, a time difference between an illumination of the display's light emitting elements for a preceding frame and an upcoming illumination of the light emitting elements for the given frame may be determined, and this time difference is used to determine a value of a light output parameter. During presentation of the image on the display, the light emitting elements can be illuminated in accordance with the value of the light output parameter. This determination iterates over a series of frames to dynamically adjust the display's light output.

20 Claims, 6 Drawing Sheets

DISPLAY SYSTEM WITH DYNAMIC LIGHT OUTPUT ADJUSTMENT FOR MAINTAINING CONSTANT BRIGHTNESS

BACKGROUND

Traditional displays for virtual reality (VR) systems, such as those embedded in a VR headset, operate at a fixed refresh rate. The "refresh rate" of a display is the number of times per second the display can refresh the image or redraw the screen (e.g., a 90 Hertz (Hz) display refreshes the image 90 times per second). Advances in graphics have led to the development of displays that support a variable refresh rate, meaning that the refresh rate of the display varies dynamically as frames are being rendered. This allows for keeping the refresh rate in sync with a varying frame rate from a graphics rendering application, such as a video game. For instance, both G-SYNC™—a technology available from NVIDIA® Corporation—and FreeSync™—a technology available from Advanced Micro Devices®, Inc.—provide logic that matches the refresh rate of the display to the frame rate of a video game. These technologies eliminate screen tearing (e.g., where an image includes some pixels from a preceding frame and some pixels from a current frame), and they allow the executing video game to target a range of frame rates instead of targeting a single frame rate, which can allow for benefiting from the fastest frame rate possible given the speed of the graphics processing unit (GPU).

While variable refresh rate technologies are suitable for use with high-persistence displays—where the backlight is on most of the time over a series of frames, these technologies are not suitable for use in VR systems because most VR systems use low persistence displays that pulse the backlight on-and-off at the refresh rate of the display. If a variable refresh rate is used with a low-persistence display, a viewing user will notice a flicker of the display as the brightness varies along with the varying refresh rate. This is because, at higher refresh rates, the light pulses occur closer together in time, creating a brightening effect, while, at lower refresh rates, the light pulses occur farther apart in time, creating a dimming effect. To a user wearing a head-mounted display (HMD), this manifests as a continuous brightening and dimming (i.e., flickering) of the display. In practice, a scene with low complexity (e.g., not many moving objects and simple textures) would appear very bright to the user because the refresh rate would likely be higher for a scene of low complexity, whereas, a scene with high complexity (e.g., many moving objects and complex textures) would appear very dim to the user because the refresh rate would likely be lower for a scene of high complexity. Accordingly, variable refresh rate display technologies have not been suitable for use in VR systems that use low-persistence displays.

Provided herein are technical solutions to improve and enhance these and other systems.

BRIEF DESCRIPTION OF THE DRAWINGS

The detailed description is described with reference to the accompanying drawings. In the figures, the left-most digit(s) of a reference number identifies the figure in which the reference number first appears. The use of the same reference numbers in different figures indicates similar or identical components or features.

DETAILED DESCRIPTION

Figure 1:
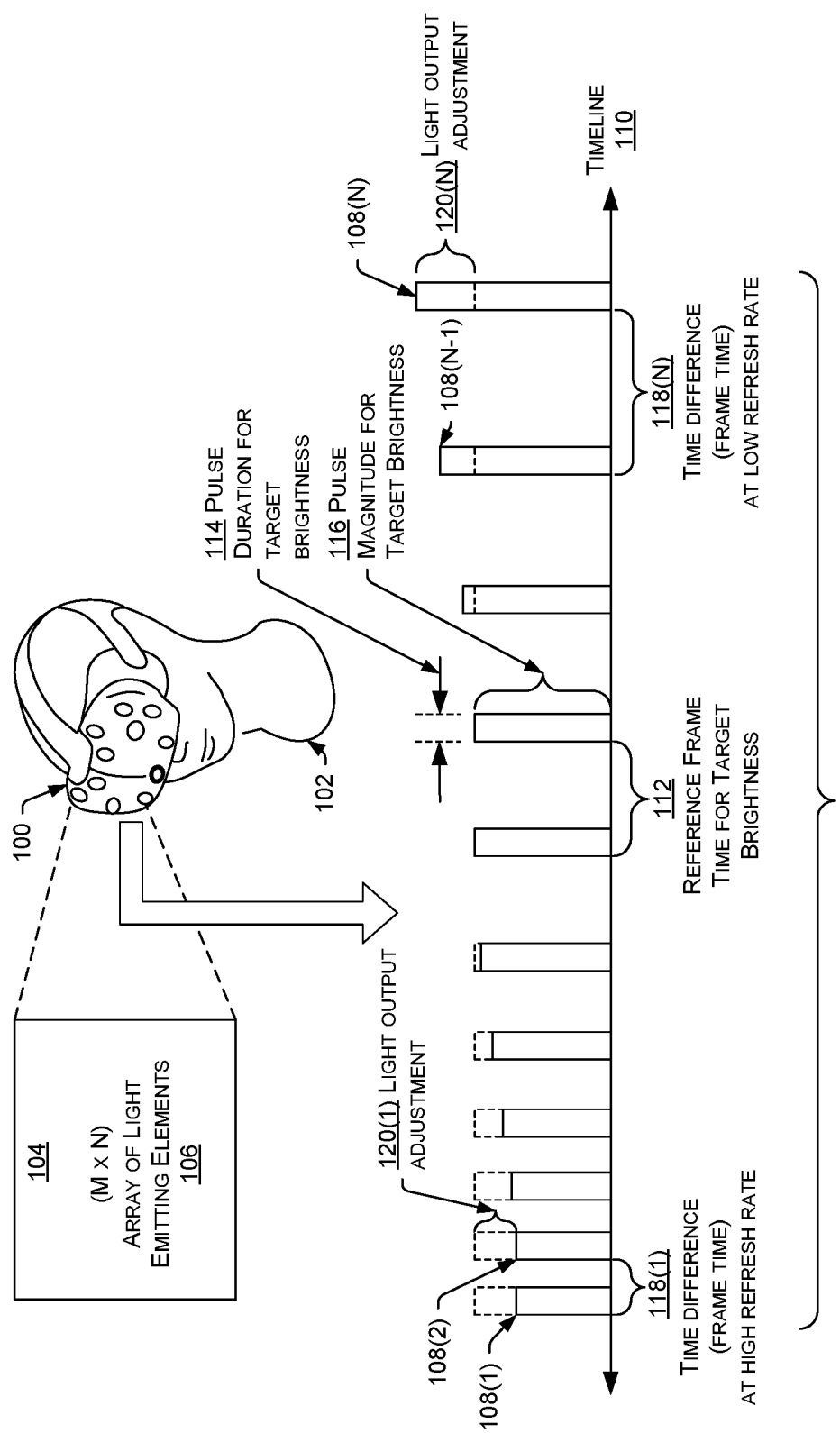
FIG. 1 is a diagram illustrating an example technique for dynamically adjusting the light output of a low-persistence, variable refresh rate display for maintaining constant brightness over a series of frames, in accordance with embodiments disclosed herein.

Described herein are, among other things, techniques and systems for dynamically adjusting the light output of a low-persistence, variable refresh rate display for maintaining constant brightness over a series of frames. A display system may include a display having an array of light emitting elements (or light sources). As mentioned, the display system may be a low-persistence display system, meaning that the light emitting elements emit light for a small fraction of a frame time. For example, for a given frame at a refresh rate of 90 Hz, the light emitting elements may illuminate (or emit a light pulse) for a duration of roughly 1 millisecond (ms) out of a total frame time that is roughly 11.11 ms. In an illustrative example, the display of the display system disclosed herein may be a head-mounted display (HMD), which may be worn by a user. In this example, the display system may be a virtual reality (VR) system or an augmented reality (AR) system. The display itself, such as a HMD, may include one or multiple display panels that present images based on frames that are output by a graphics rendering application, such as a video game. These images are viewed by a user through the optics that are included in the HMD, making the user perceive the images as if the user was immersed in a VR or AR environment.

The display described herein may support a variable refresh rate. Accordingly, a graphics rendering application, such as a video game, may render frames at a variable frame rate, and the refresh rate of the display may be adjusted dynamically to match (or stay in sync with) the frame rate of the application. In this manner, the application can target a range of frame rates, and the refresh rate of the display can be tied to the frame rate of the application so that a single frame is rendered, and a corresponding image is presented, with every screen refresh. Because the refresh rate can vary dynamically, if the light output of the light emitting elements remains constant for each light pulse, the brightness of the display can fluctuate over a series of frames, and this can be perceived by the user as a flickering of the display.

Accordingly, described herein are techniques and systems for maintaining a constant brightness of a low-persistence display that supports a variable refresh rate. Logic of the disclosed display system may be configured to output first pixel data to a frame buffer for purposes of presenting a corresponding first image on the display, the first pixel data being associated with a first frame of a series of frames. The logic may determine a first time difference between an illumination (or a light pulse) of the light emitting elements of the display for a preceding frame of the series of frames and an upcoming illumination (or a light pulse) of the light emitting elements for the first frame corresponding to the to-be-presented first image. Based on this first time difference (which is indicative of the instantaneous refresh rate of the display), logic of the display system may determine a first value of a light output parameter. During presentation of the first image on the display, the light emitting elements may be controlled to illuminate in accordance with the first value of the light output parameter. This process may iterate over a series of frames by dynamically determining a value of the light output parameter for each frame, and, as a result of varying the light output parameter in this way over a series of frames, the display brightness remains substantially constant over the series of frames, thereby eliminating, or at least mitigating, flickering.

In general, if the time difference between a pair of sequential light pulses corresponding to a pair of sequential frames is relatively short (meaning a relatively high refresh rate), the logic of the display system determines a value of the light output parameter that causes a decrease in the magnitude or the duration of the light output from the light emitting elements. If, on the other hand, the time difference between a pair of sequential light pulses is relatively long (meaning a relatively low refresh rate), the logic of the display system determines a value of the light output parameter that causes an increase in the magnitude or the duration of the light output from the light emitting elements. In this manner, a constant brightness is achieved by increasing the magnitude and/or duration of light output at relatively low refresh rates and decreasing the magnitude and/or duration of light output at relatively high refresh rates.

As mentioned, adjusting the light output of the light emitting elements of the display can be accomplished in multiple ways. For example, the pulse of light for a given frame can be made taller than the preceding frame or a reference pulse height (e.g., by controlling the light emitting elements to emit light at a higher luminous intensity). In the reverse direction, the pulse of light for a given frame can be made shorter than the preceding frame or a reference pulse height (e.g., by illuminating the light emitting elements at a lower luminous intensity). Additionally, or alternatively, to making the pulse of light taller or shorter, the pulse of light for a given frame can be made wider than the preceding frame or a reference pulse width (e.g., by illuminating the light emitting elements for a longer duration). In the reverse direction, the pulse of light for a given frame can be made thinner than the preceding frame or a reference pulse width (e.g., by illuminating the light emitting elements for a shorter duration). To maintain a constant brightness, the area under the pulse (e.g., the area under a square waveform representing the pulse) may remain constant notwithstanding the dynamic adjustment to the height and/or the width of the pulse (or its representative waveform).

In some embodiments, a reference frame time is associated with a target level of brightness at which the display is to remain constant. This reference frame time can be used to determine the value of the light output parameter. For instance, upon determining a time difference between sequential light pulses corresponding to a pair of sequential frames, the logic may determine a ratio of the time difference to the reference frame time, and this ratio can be used to determine the value of the light output parameter for adjusting the light output of the light emitting elements for the current frame. The reference frame time may be a time corresponding to an intermediate frame rate between a minimum frame rate and a maximum frame rate of a range of frame rates targeted by the application. For example, if the application targets a range of frame rates between 45 frames per second (FPS) and 144 FPS, a reference frame time used to determine the aforementioned ratio may correspond to the frame time at a frame rate of 90 FPS, which is a frame time of roughly 11.11 ms. This is merely an example, and the reference frame time is configurable based in part on the specifications of the display system in which the techniques described herein are implemented.

Also described herein are techniques and systems for applying "re-projection" adjustments in a low-persistence, variable refresh rate display system, such as a display system that includes a HMD. The described re-projection techniques may be used to compensate for slight inaccuracies in an original pose prediction of the HMD, which, in turn, is based on a predicted illumination time for the given frame that is predicted before the given frame is rendered. Using re-projection, pixel data received from the application for the given frame can be modified, such as by transforming (e.g., through rotation and re-projection calculations) the pixel data in a way that accounts for an updated determination of the pose of the HMD after the actual render time of the frame is known to the display system. Re-projection can be used to mitigate unwanted visual artifacts by presenting the correct pixels at a time that light from the display reaches the eye(s) of the user.

By dynamically adjusting the light output based on the time difference between sequential pulses of light for a pair of sequential frames (the time difference being indicative of the instantaneous frame rate), flickering of the display (i.e., a fluctuation in brightness) over a series of frames can be mitigated, if not eliminated. This can be done independently of re-projection, or in combination with re-projection. When dynamic light output adjustment is combined with the re-projection techniques described herein, a more robust display system is provided that mitigates visual artifacts while also maintaining a constant brightness of the display. In other words, the techniques and systems described herein allow for a display system that presents the correct scene for where the user is currently looking, and doing so while maintaining a constant brightness of the display.

The techniques and processes disclosed herein may be implemented by a system, such as a HMD system. Also disclosed herein are non-transitory computer-readable media storing computer-executable instructions to implement the techniques and processes disclosed herein. Although the techniques and systems disclosed herein are discussed, by way of example, in the context of video game applications, and specifically VR gaming applications, it is to be appreciated that the techniques and systems described herein may provide benefits with other applications, including, without limitation, non-VR applications (e.g., AR applications), and/or non-gaming applications, such as industrial machine applications, defense applications, robotics applications, and the like. In addition, the techniques and processes described herein can be implemented in non-HMD systems, such as other display systems that are not considered "near-to-eye" display systems, or that do not involve a wearable device. Furthermore, although particular benefits are described for low-persistence display systems that support a variable refresh rate, the techniques and processes described herein may be implemented in other types of display systems, and it is to be appreciated that the techniques and processes described herein are not necessarily limited to low-persistence display systems or variable refresh rate display systems.

FIG. 1 is a diagram illustrating an example technique for dynamically adjusting the light output of a low-persistence, variable refresh rate display for maintaining constant brightness over a series of frames, in accordance with embodiments disclosed herein. FIG. 1 depicts a head-mounted display (HMD) 100 worn by a user 102. The HMD 100 is an example of a display system that may implement the techniques and processes described herein. As such, the HMD 100 may sometimes be referred to herein simply as a "display" or a "display system." The HMD 100 in the example of FIG. 1 may include a single display panel 104 or multiple display panels 104, such as a left display panel and a right display panel of a stereo pair of display panels. The one or more display panels 104 of the HMD 100 may be used to present a series of image frames (herein referred to as "frames") that are viewable by a user 102 wearing the HMD 100. It is to be appreciated that the HMD 100 may include any number of display panels 104 (e.g., more than two display panels, a pair of display panels, or a single display panel). Hence, the terms "display panel," as used in the singular herein, may refer to a single display panel 104 of a display system with any number of display panels (e.g., "display panel" may refer to either display panel 104 of a pair of display panels). In a two-panel HMD 100, for example, a stereo frame buffer may render, for instance, 2160×1200 pixels on both display panels of the HMD 100 (e.g., 1080×1200 pixels per display panel).

The HMD 100 may utilize any suitable type of display technology, such as an emissive display that utilizes light emitting elements (e.g., light emitting diodes (LEDs)) to emit light during presentation of frames on the display panel(s) 104. As an example, display panels 104 of the HMD 100 may comprise liquid crystal displays (LCDs), organic light emitting diode (OLED) displays, inorganic light emitting diode (ILED) displays, or any other suitable type of display technology for HMD applications.

The display panel(s) 104 of the HMD 100 may support a variable refresh rate. Accordingly, the HMD 100 may be operable over any suitable range of refresh rates, such as a range of 45 Hertz (Hz) to 144 Hz, a range of 45 Hz to 120 Hz, a range of 90 Hz to 144 Hz, or any suitable range of refresh rates. The "refresh rate" of a display is the number of times per second the display can refresh the image or redraw the screen. The number of frames displayed per second may be equivalent to the instantaneous refresh rate of the display. In other words, as a series of frames is processed (e.g., rendered), and as images are presented on the display, the logic of the HMD 100 may target an objective of presenting an image for a single frame of the series of frames with every screen refresh.

The HMD 100 can implement any suitable low-persistence driving scheme including, without limitation, a "global flashing" type of display driving scheme or a "rolling band" type of display driving scheme. Using a global flashing technique, all of the light emitting elements 106 (e.g., a M×N array of light emitting elements 106, sometimes referred to herein as "light sources" 106) may illuminate in synchronization to present a single image on the display(s) for a given frame by illuminating all of the pixels of the display(s). Using a rolling band technique, individual subsets of the light emitting elements 106, and, hence, individual subsets of the pixels, can be illuminated independently and sequentially in a rolling band of illumination during an illumination time period. This rolling band technique may be enabled by the light emitting elements 106 being individually-addressable. In some embodiments, both the array of pixels and the light emitting elements 106 on the display panel(s) 104 are arranged in rows and columns, but not necessarily with a one-pixel per one-light emitting element 106 correspondence. In this configuration, for a rolling band type of display driving scheme, individual rows and/or individual columns of light emitting elements 106 may be addressed in sequence, and/or individual groups of contiguous rows and/or individual groups of contiguous columns of light emitting elements 106 may be addressed in sequence. As a consequence of addressing the light emitting elements 106 in this "rolling" manner, the subsets of pixels that correspond to these individually-addressable subsets of light emitting elements 106 may be "illuminated" independently.

As used herein, "illuminating a pixel" means illuminating the light emitting element 106 that corresponds to that pixel. For example, a LCD illuminates a light emitting element 106 of a backlight to illuminate the corresponding pixel(s) of the display. Furthermore, as used herein, a "subset of pixels" may comprise an individual pixel or multiple pixels (e.g., a group of pixels). Likewise, a "subset of light emitting elements 106" may comprise an individual light emitting element 106 or multiple light emitting elements 106 (e.g., a group of light emitting elements 106). In some embodiments, a subset of pixels includes a row of pixels, a column of pixels, a group of contiguous rows of pixels, or a group of contiguous columns of pixels. Likewise, a subset of light emitting elements 106 may include a row of light emitting elements 106, a column of light emitting elements, a group of contiguous rows of light emitting elements 106, or a group of contiguous columns of light emitting elements 106. Thus, in an aspect of the techniques and systems described herein, subsets of pixels can be scanned out and illuminated in sequence (sequentially), such as by scanning out and illuminating each row of pixels in sequence, starting with a first row of the pixels (e.g., a top row of pixels) and ending with a last row of the pixels (e.g., a bottom row of pixels), such as by illuminating corresponding subsets of light emitting elements in sequence. However, any suitable pattern of illumination can be employed using the techniques and systems described herein (e.g., a snake-like pattern of illumination, column-by-column illumination, multiple rows/columns of pixels or light emitting elements 106 at a time in sequence, etc.).

In order to drive the display panel(s) 104, the HMD 100 may include, among other things, a display controller(s), such as a microcontroller(s) or a similar processor(s), display driver circuitry, and similar electronics for driving the display panel(s) 104. Display driver circuitry may be coupled to the array of light emitting elements 106 of the display panel(s) 104 via conductive paths, such as metal traces, on a flexible printed circuit. In an example, a display controller(s) may be communicatively coupled to the display driver circuitry and configured to provide signals, information, and/or data to the display driver circuitry. The signals, information, and/or data received by the display driver circuitry may include one or more light output parameters that cause the display driver circuitry to illuminate the light emitting elements 106 in a particular way. That is, the display controller(s) may determine which light emitting element(s) 106 is/are to be illuminated, when the element(s) 106 is/are to illuminate, a magnitude of light output (e.g., height of the pulse), and/or a duration of the light output (e.g., width of the pulse), etc., and the display controller(s) may communicate the appropriate signals, information, and/or data (e.g., one or more light output parameters) to the display driver circuitry in order to accomplish that objective.

Pixel data for a given frame can be output to a frame buffer for presenting the frame as an image on the HMD 100, or the display panel(s) 104 thereof. Pixel data for each frame may, in some embodiments, include a two-dimensional array of per-pixel values (e.g., color values). In some embodiments, the pixel data further includes additional data or metadata, such as depth values. In some embodiments, pixel data may include data for each pixel that is represented by a single set of color and alpha values (e.g., one color value for a red channel, one color value for a green channel, one color value for a blue channel, and one or more values for one or more alpha channels). This pixel data can be output to a frame buffer (e.g., a stereo frame buffer) to present on image(s) on the display panel(s) 104 of the HMD 100 with a desired visual effect.

The HMD 100 may represent a VR headset for use in VR systems, such as for use with a VR gaming system. However, the HMD 100 may additionally, or alternatively, be implemented as an AR headset for use in AR applications. In AR, a user 102 sees virtual objects overlaid on a real-world environment, whereas, in VR, the user 102 does not see a real-world environment, but is fully immersed in a virtual environment, as perceived via the display panel(s) 104 and the optics (e.g., lenses) of the HMD 100. Examples described herein pertain primarily to a VR-based HMD 100, but it is to be appreciated that the HMD 100 is not limited to implementation in VR applications, nor is the display system limited to implementation with a HMD 100.

In general, a graphics-based application (e.g., a video game) executing on a computing device—such as the HMD 100 itself, or a computing device (e.g., a personal computer (PC), game console, etc.) associated with, and coupled to, the HMD 100 as part of a display/HMD system—may be configured to output a series of frames. The series of frames are ultimately presented as images on the display panel(s) 104 of the HMD 100. During presentation of a single image corresponding to a single frame, the low-persistence display system is configured to pulse the light emitting elements 106 of the display panel(s) 104 so that light is emitted towards the user's 102 eye(s), enabling the user 102 to see the image that is presented on the display during the pulse of light 108. The timeline 110 shown in FIG. 1 illustrates a series of light pulses 108(1), 108(2), . . . 108(N) (collectively 108) that may occur at a variable refresh rate of the display system. Each of these light pulses 108 represent a discrete emission of light from the light emitting elements 106 for a given frame. The series of light pulses 108 offset from, but synchronized with, the rendering of the series of frames by the application due to logic that matches the refresh rate of the HMD 100 to the frame rate of the application that is rendering the frames.

As shown by the timeline 110 in FIG. 1, the HMD 100 transitions, over time, from a relatively high refresh rate (towards the left side of the timeline 110) to a relatively low refresh rate (towards the right side of the timeline 110). In an illustrative example, the refresh rate towards the left side of the timeline 110 may be on the order of 144 Hz, while the refresh rate towards the right side of the timeline 110 may be on the order of 60 Hz. In this respect the timeline 110 in FIG. 1 is not to scale, but is merely illustrative of a variable refresh rate generally.

FIG. 1 shows a reference frame time 112 (sometimes referred to as a "nominal" frame time), which may be associated with a target level of brightness at which the display is to remain constant. Consider an example where the reference frame time 112 is roughly 11.11 ms, which corresponds to a refresh rate of 90 Hz. In this example, if the refresh rate remained constant at 90 Hz, the light emitting elements 106 would be consistently illuminated over a series of frames in accordance with a value of a light output parameter(s) that corresponds to a light pulse 108 with a pulse duration 114 and a pulse magnitude 116, as shown in the middle of the timeline 110 in FIG. 1. Light pulses 108 with a pulse duration 114 and a pulse magnitude 116 at a refresh rate that corresponds to the reference frame time 112 achieves the target level of brightness at which the display is to remain constant. Accordingly, as the refresh rate varies, light output adjustments are dynamically made in order to keep the brightness constant at this target level.

During the relatively high refresh rate towards the left side of the timeline 110, and at a time between the light pulses 108(1) and 108(2), logic of the display system may determine a first time difference 118(1) between a light pulse 108(1)—that is, an illumination of the light emitting elements 106 for a preceding frame of the series of frames—and an upcoming light pulse 108(2)—that is, an upcoming illumination of the light emitting elements 106 for the current frame. Based at least in part on the first time difference 118(1) (which is indicative of the instantaneous refresh rate), the logic may determine a value of a light output parameter(s). The light output parameter, in the example of FIG. 1, corresponds to, or dictates, the height of the light pulse 108(2) for the current frame. Accordingly, this value of the light output parameter(s) that is determined based on the time difference 118(1) may be used to control the light emitting elements 106 to emit the light pulse 108(2) at a particular magnitude. This particular magnitude of the light pulse 108(2) is shown in FIG. 1 as being less than the pulse magnitude 116 that is associated with the target level of brightness for the reference frame time 112. In other words, because the refresh rate towards the left of the timeline 110 is higher than the refresh rate corresponding to the reference frame time 112 in the middle of the timeline 110, the height or magnitude of the light pulse 108(2) can be adjusted, via the light output adjustment 120(1), to a magnitude that is less than the pulse magnitude 116 associated with the reference frame time 112. That is, the dashed outline represents a "reference pulse" at the pulse magnitude 116 and the pulse duration 114, and the solid outline represents the actual light pulse 108(2), the reference pulse shown to illustrate the magnitude of the light pulse 108(2) relative to the magnitude 116 of the reference pulse. Controlling the luminous intensity of light output for the light pulse 108(2) may comprise driving the light emitting element(s) 106 at a lower current, and/or a lower voltage than the current and/or voltage that would be used to drive the light emitting element(s) 106 at a refresh rate corresponding to the reference frame time 112. In some embodiments, the control of the light output (or the light output adjustment 120(1)) is performed digitally by setting a digitized value to control the light output of the light pulse 108(2).

During the relatively low refresh rate towards the right side of the timeline 110, and at a time between the light pulses 108(N−1) and 108(N), logic of the display system may determine a $N^{th}$ time difference 118(N) between a light pulse 108(N−1)—or, an illumination of the light emitting elements 106 for a preceding frame of the series of frames—and an upcoming light pulse 108(N)—or, an upcoming illumination of the light emitting elements 106 for the current frame. Based at least in part on the N$^{th}$ time difference 118(N) (which is indicative of the instantaneous refresh rate), the logic may determine a value of a light output parameter(s), which may correspond to, or dictate, the height of the light pulse 108(N) for the current frame. Accordingly, this value of the light output parameter(s) that is determined based on the time difference 118(N) may be used to control the light emitting elements 106 to emit the light pulse 108(N) at a particular magnitude. This particular magnitude of the light pulse 108(N) is shown in FIG. 1 as being greater than the pulse magnitude 116 that is associated with the target level of brightness for the reference frame time 112. In other words, because the refresh rate towards the right of the timeline 110 is lower than the refresh rate corresponding to the reference frame time 112 in the middle of the timeline 110, the height or magnitude of the light pulse 108(N) can be adjusted, via the light output adjustment 120(N), to a magnitude that is greater than the pulse magnitude 116 associated with the reference frame time 112. Controlling the luminous intensity of light output for the light pulse 108(N) may comprise driving the light emitting element(s) 106 at a higher current, and/or a higher voltage than the current and/or voltage that would be used to drive the light emitting element(s) 106 at a refresh rate corresponding to the reference frame time 112. In some embodiments, the control of the light output (or the light output adjustment 120(N)) is performed digitally by setting a digitized value to control the light output of the light pulse 108(N). Notably, the display driving circuit has sufficient (or extra) bandwidth to provide the ability to increase the height of the pulse.

In some embodiments, the reference frame time 112 is used to determine the values of the light output parameter that correspond to the magnitudes of the light pulses 108 shown in FIG. 1. For instance, the logic of the display system may determine a ratio of the first time difference 118(1) to the reference frame time 112, and this ratio can be used to determine the value of the light output parameter for the light output adjustment 120(1) associated with the light pulse 108(2). Consider an example where the first time difference 118(1) is roughly 8.3 ms, which corresponds to a refresh rate of 120 Hz, and where the reference frame time 112 is roughly 11.11 ms, which corresponds to a refresh rate of 90 Hz. In this example, the following ratio can be calculated:

$$\frac{8.3}{11.11} = 0.75.$$

In this example, the light pulse 108(2) can be adjusted to a magnitude that is roughly 75% of the pulse magnitude 116 that is associated with the target level of brightness for the reference frame time 112. Because the pulses 108(1) and 108(2) are relatively closer together in time, the downward adjustment of the pulse magnitude compensates for the increase in brightness caused by the more densely packed light pulses 108 at the relatively high refresh rate, which maintains a constant brightness for the HMD 100.

Consider an example where the N$^{th}$ time difference 118(N) is roughly 16.66 ms, which corresponds to a refresh rate of 60 Hz, and where the reference frame time 112 is still 11.11 ms. In this example, the following ratio can be calculated:

$$\frac{16.66}{11.11} = 1.50.$$

In this example, the light pulse 108(N) can be adjusted to a magnitude that is roughly 150% of the pulse magnitude 116 that is associated with the target level of brightness for the reference frame time 112. Because the pulses 108(N−1) and 108(N) are relatively farther apart in time, the upward adjustment of the pulse magnitude compensates for the decrease in brightness caused by the more dispersed light pulses 108 at the relatively low refresh rate, which maintains a constant brightness for the HMD 100.

Figure 2:
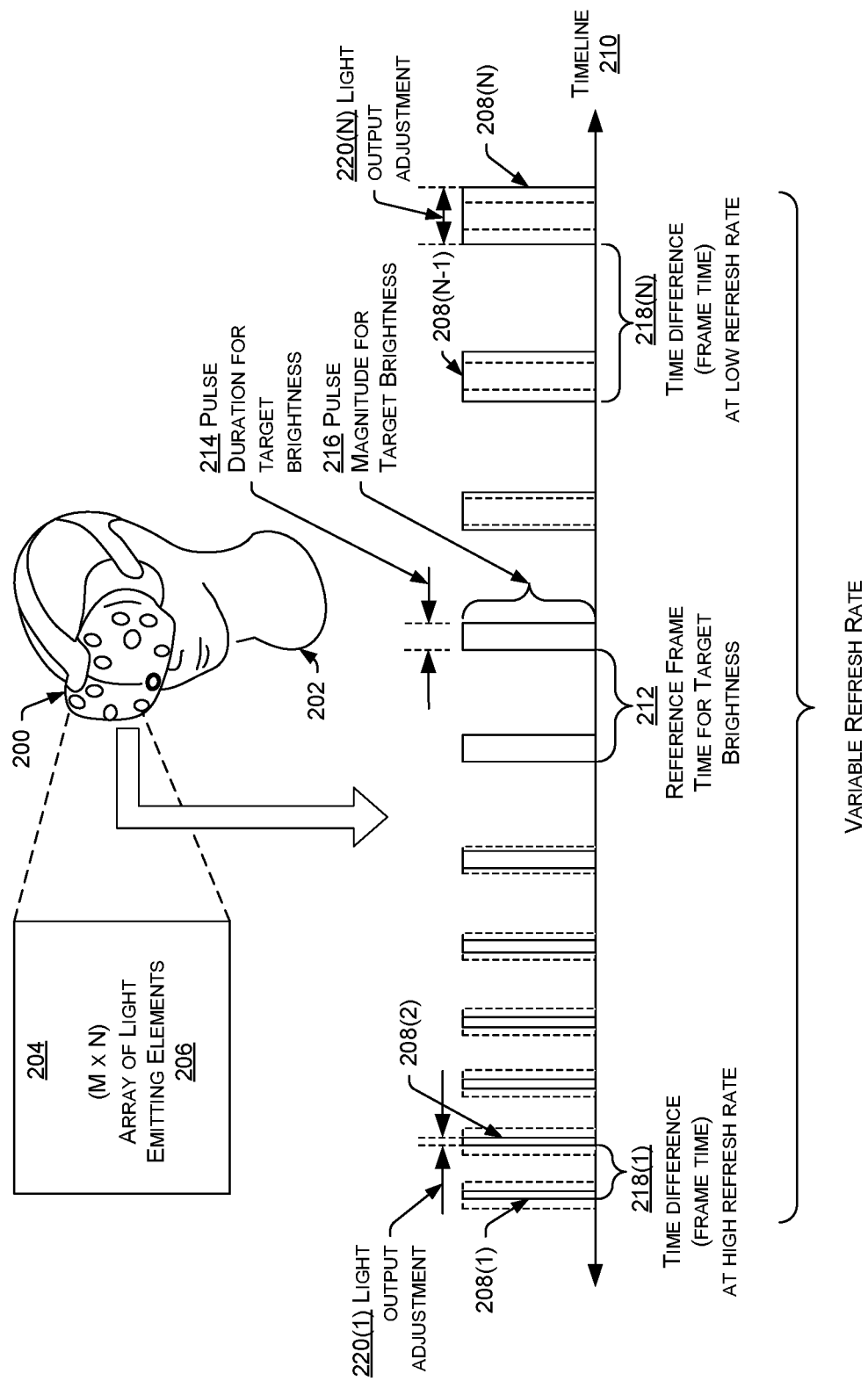
FIG. 2 is a diagram illustrating another example technique for dynamically adjusting the light output of a low-persistence, variable refresh rate display for maintaining constant brightness over a series of frames, in accordance with embodiments disclosed herein.

FIG. 2 is a diagram illustrating another example technique for dynamically adjusting the light output of a low-persistence, variable refresh rate display for maintaining constant brightness over a series of frames, in accordance with embodiments disclosed herein. As shown by the timeline 210 in FIG. 2, like the example of FIG. 1, the HMD 200 transitions, over time, from a relatively high refresh rate (towards the left side of the timeline 210) to a relatively low refresh rate (towards the right side of the timeline 210). In an illustrative example, the refresh rate towards the left side of the timeline 210 may be on the order of 144 Hz, while the refresh rate towards the right side of the timeline 210 may be on the order of 60 Hz. In this respect the timeline 210 in FIG. 2 is also not to scale, but is merely illustrative of a variable refresh rate generally.

FIG. 2 shows a reference frame time 212, which, again, may be associated with a target level of brightness at which the display is to remain constant. Light pulses 208 with a pulse duration 214 and a pulse magnitude 216 at a refresh rate that corresponds to the reference frame time 212 achieves the target level of brightness at which the display is to remain constant. Accordingly, as the refresh rate varies, light output adjustments are dynamically made in order to keep the brightness constant at this target level.

During the relatively high refresh rate towards the left side of the timeline 210, and at a time between the light pulses 208(1) and 208(2), logic of the display system may determine a first time difference 218(1) between a light pulse 208(1)—that is, an illumination of the light emitting elements 206 for a preceding frame of the series of frames—and an upcoming light pulse 208(2)—that is, an upcoming illumination of the light emitting elements 206 for the current frame. Based at least in part on the first time difference 218(1) (which is indicative of the instantaneous refresh rate), the logic may determine a value of a light output parameter(s). The light output parameter, in the example of FIG. 2, corresponds to, or dictates, the width of the light pulse 208(2) for the current frame. Accordingly, this value of the light output parameter(s) that is determined based on the time difference 218(1) may be used to control the light emitting elements 206 to emit the light pulse 208(2) for a particular duration. This particular duration of the light pulse 208(2) is shown in FIG. 2 as being shorter than the pulse magnitude 214 that is associated with the target level of brightness for the reference frame time 212. In other words, because the refresh rate towards the left of the timeline 210 is higher than the refresh rate corresponding to the reference frame time 212 in the middle of the timeline 210, the width or duration of the light pulse 208(2) can be adjusted, via the light output adjustment 220(1), to a duration that is less than the pulse duration 214 associated with the reference frame time 212. Controlling the duration of light output for the light pulse 208(2) may comprise driving the light emitting element(s) 206 for a shorter amount of time than the amount of time the light emitting element(s) 206 would be driven for at a refresh rate corresponding to the reference frame time 212. In some embodiments, the control of the light output (or the light output adjustment 220(1)) is performed digitally by setting a digitized value to control the light output of the light pulse 208(2).

During the relatively low refresh rate towards the right side of the timeline 210, and at a time between the light pulses 208(N−1) and 208(N), logic of the display system may determine a $N^{th}$ time difference 218(N) between a light pulse 208(N−1)—or, an illumination of the light emitting elements 206 for a preceding frame of the series of frames—and an upcoming light pulse 208(N)—or, an upcoming illumination of the light emitting elements 206 for the current frame. Based at least in part on the $N^{th}$ time difference 218(N) (which is indicative of the instantaneous refresh rate), the logic may determine a value of a light output parameter(s), which may correspond to, or dictate, the width of the light pulse 208(N) for the current frame. Accordingly, this value of the light output parameter(s) that is determined based on the time difference 218(N) may be used to control the light emitting elements 206 to emit the light pulse 208(N) for a particular duration. This particular duration of the light pulse 208(N) is shown in FIG. 2 as being longer than the pulse duration 214 that is associated with the target level of brightness for the reference frame time 212. In other words, because the refresh rate towards the right of the timeline 210 is lower than the refresh rate corresponding to the reference frame time 212 in the middle of the timeline 210, the height or magnitude of the light pulse 208(N) can be adjusted, via the light output adjustment 220(N), to a width or duration that is greater than the pulse duration 214 associated with the reference frame time 212. Controlling the duration of light output for the light pulse 208(N) may comprise driving the light emitting element(s) 106 for a longer amount of time than the amount of time the light emitting element(s) 206 would driven at a refresh rate corresponding to the reference frame time 212. In some embodiments, the control of the light output (or the light output adjustment 220(N)) is performed digitally by setting a digitized value to control the light output of the light pulse 208(N). Notably, the display driving circuit has sufficient (or extra) bandwidth to provide the ability to increase the width of the pulse.

Again, the reference frame time 212 can be used to determine the values of the light output parameter that correspond to the durations of the light pulses 108 shown in FIG. 2. For instance, the logic of the display system may determine a ratio of the first time difference 218(1) to the reference frame time 212, and this ratio can be used to determine the value of the light output parameter for the light output adjustment 220(1) associated with the light pulse 208(2). Consider an example where the first time difference 218(1) is roughly 8.3 ms, which corresponds to a refresh rate of 120 Hz, and where the reference frame time 212 is roughly 11.11 ms, which corresponds to a refresh rate of 90 Hz. In this example, the following ratio can be calculated:

$$\frac{8.3}{11.11} = 0.75.$$

In this example, the light pulse 208(2) can be adjusted to a duration that is roughly 75% of the pulse duration 214 that is associated with the target level of brightness for the reference frame time 212. Because the pulses 208(1) and 208(2) are relatively closer together in time, the shortening of the pulse duration compensates for the increase in brightness caused by the more densely packed light pulses 208 at the relatively high refresh rate, which maintains a constant brightness for the HMD 200.

Consider an example where the $N^{th}$ time difference 218(N) is roughly 16.66 ms, which corresponds to a refresh rate of 60 Hz, and where the reference frame time 212 is still 11.11 ms. In this example, the following ratio can be calculated:

$$\frac{16.66}{11.11} = 1.50.$$

In this example, the light pulse 208(N) can be adjusted to a duration that is roughly 150% of the pulse duration 214 that is associated with the target level of brightness for the reference frame time 212. Because the pulses 208(N−1) and 208(N) are relatively farther apart in time, the lengthening of the pulse duration compensates for the decrease in brightness caused by the more dispersed light pulses 208 at the relatively low refresh rate, which maintains a constant brightness for the HMD 200.

The respective approaches shown in FIGS. 1 and 2 may be combined in some embodiments. For example, the magnitude and the duration of a light pulse 108 can be dynamically adjusted by determining a first value of a first light output parameter corresponding to the magnitude of the light pulse 108/208 and determining a second value of a second light output parameter corresponding to the duration of the light pulse 108/208, where the light emitting elements are illuminated in accordance with both the first value and the second value to adjust the light output.

In embodiments where the display system uses a rolling band type of display driving scheme, the light output may be adjusted at least in part by changing the thickness of the rolling band that traverses the display panel 104/204 during the illumination time period for a given frame. That is, the value of the light output parameter may correspond to a number of light emitting elements that are simultaneously illuminated (e.g., a number of rows that make up the rolling band of illumination). While a display system that uses a global flashing type of display driving scheme can adjust the duration of a light pulse 108/208, the rolling band equivalent of adjusting the duration of the light pulse may be to adjust (e.g., increase or decrease) the number of light emitting elements that are simultaneously illuminated during the illumination time period. A "thicker" rolling band may effectively shorten the duration of the light pulse, while a "thinner" rolling band may effectively lengthen the duration of the light pulse.

It is to be appreciated that determining the time difference 118/218 between a sequential pair of light pulses 108/208 corresponding to a sequential pair of frames may include determining a time difference between any two corresponding points between the pair of light pulses 108/208 or the pair of frames. For example, the time difference 118/218 between the start of each light pulse 108/208, the midpoint of each light pulse 108/208, the end of each light pulse 108/208, etc. can be determined. The display system logic may, in some embodiments, include start-of-frame markers in the pixel data between each application-rendered frame, and these start-of-frame markers can be used to determine a time difference for purposes of determining the value of the light output parameter.

Figure 3:
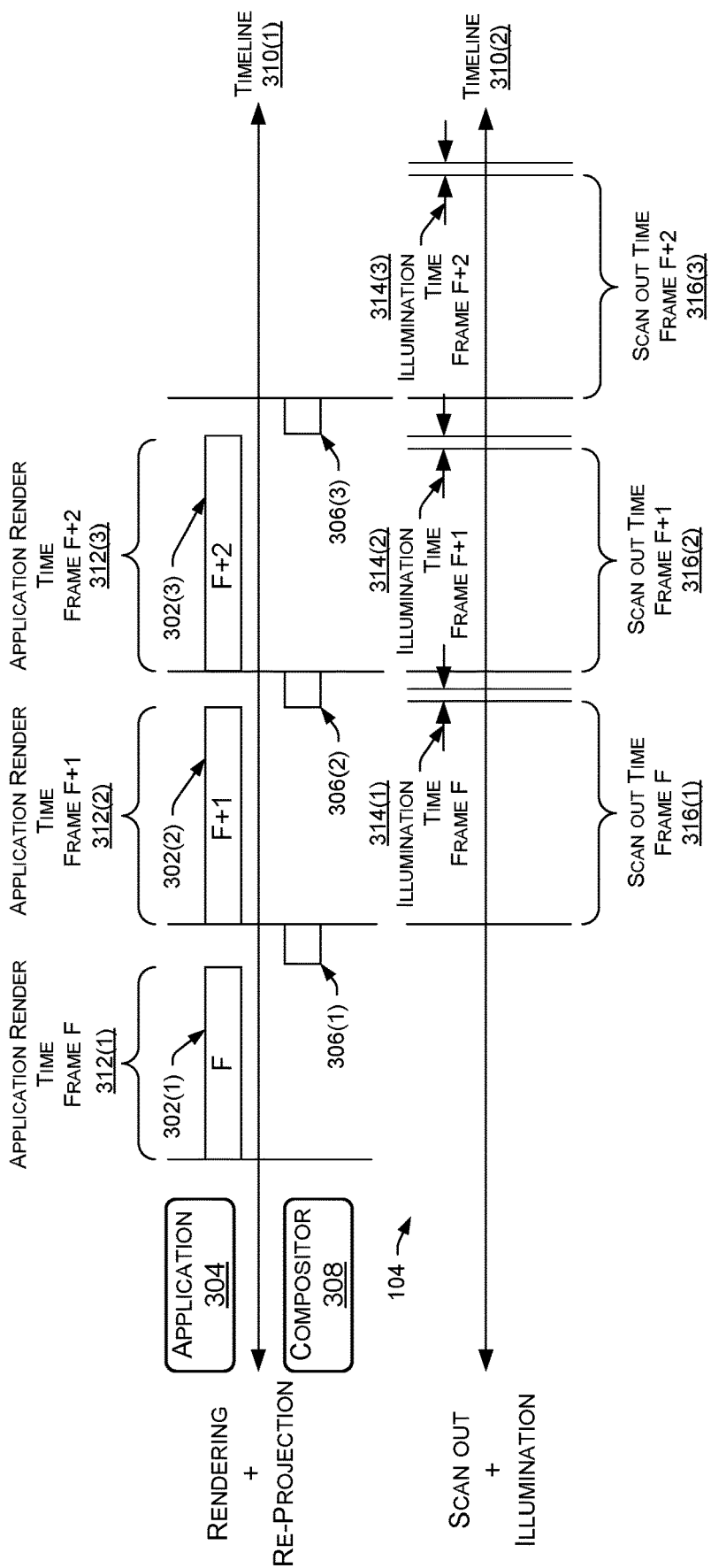
FIG. 3 is a diagram illustrating example timelines for rendering a series of frames with re-projection at a variable frame rate, and presenting corresponding images at a variable refresh rate, in accordance with embodiments disclosed herein.

FIG. 3 is a diagram illustrating example timelines 310(1) and 310(2) for rendering a series of frames 302 with re-projection at a variable frame rate, and presenting corresponding images at a variable refresh rate, in accordance with embodiments disclosed herein. The example of FIG. 3 depicts three example frames 302(1) (or frame "F"), 302(2) (or frame "F+1"), and 302(3) (or frame "F+2") with respect to a rendering timeline 310(1) to illustrate how the frames 302 can be rendered in series. Here, an application 304 renders frame F first, then frame F+1, and then frame F+2, in sequence, from left to right on the rendering timeline 310(1). The rendering timeline 310(1) also shows the rendering workloads 306 of a compositor 308 of the HMD 100/200 (or display system) towards the end of each rendering interval for each frame 302. The application 304 spends an amount of time rendering each frame 302. This amount of time is denoted in FIG. 3 as the application render time 312. Because frame rate may vary, the application render time 312(1) for the frame 302(1) (or frame "F"), the application render time 312(2) for the frame 302(2) (or frame "F+1"), and the application render time 312(3) for the frame 302(2) (or frame "F+2") may be different amounts of time. FIG. 3 shows an example where the application render time 312 gets progressively longer from frame F to frame F+2.

An individual rendering workload 306 of the compositor 308 for a given frame 302 may represent adjustments that are applied to the pixel data output by the application 304 before rendering a final image on the HMD 100/200. The rendering workload 306 may be about 1% to 5% of the rendering workload of the application 304, which means that it typically takes much longer for the application 304 to render the frame 302 than it does for the compositor 308 to apply adjustments to the pixel data output by the application 304 during the rendering workload 306 of the compositor 308. Such adjustments may include, without limitation, adjustments for chromatic distortion, panel masking, re-projection, and the like, which are applied to the frame 302 output by the application 304 before rendering a final image on the HMD 100/200. The application 304 may represent a video game application, or any other type of graphics-based application. The application 304 may be executed in a graphics pipeline that outputs pixel data, and the compositor 308 is configured to modify that pixel data, and to output the modified pixel data to a frame buffer (e.g., a stereo frame buffer).

Before the application 304 starts rendering a given frame 302, logic of the display system (e.g., the compositor 308) may determine a predicted illumination time 314 for the given frame 302, which represents a time at which the light emitting elements 106/206 will illuminate for the given frame 302. The actual illumination times 314(1), 314(2), and 314(3) for frames 302(1), 302(2), and 302(3), respectively, are shown on the "scan out+illumination" timeline 310(2). The compositor 308 (or other logic) is tasked with predicting this illumination time 314 for each frame, which is variable due to the variable frame rate and the variable refresh rate. The compositor's 308 prediction of the illumination time 314 may be based on historical application render times 312. For example, the compositor 308 may look at the application render time 312 for the preceding frame (frame F−1, which is not shown in FIG. 3), and may assume that the application render time 312(1) for frame F will be the same as the preceding frame. The compositor 308 may add a fixed scan out time 316 to the predicted application render time 312 to determine the predicted illumination time 314.

This predicted illumination time 314 is used with head tracking data generated by a head tracking system of the HMD 100/200 to determine a predicted pose that the HMD 100/200 will be in at the predicted illumination time 314 for the given frame 302. The compositor 308 sends pose data indicative of this predicted pose to the application 304 for rendering the frame 302, and pixel data for the frame 302 is received from the application 304 when it is finished rendering the frame 302. Providing the pose data to the application 304 in advance allows the application 304 to output pixel data for rendering imagery on the HMD 100/200 in a way that is correct for the user's 102/202 predicted head pose at the future predicted illumination time 314. This means that the application 304 renders a scene that is appropriate for the user's predicted head pose at the illumination time 314 when light from the display panel(s) 104/204 reaches the user's 102/202 eye(s). In the example of FIG. 3, after frame F is rendered by the application 304, the compositor 308 may determine the actual application render time 312(1) for frame F, and may update its determination of the illumination time 314, and based on this updated illumination time 314, an updated pose of the HMD 100/200 can be determined. Based on the original predicted pose of the HMD 100/200 and the updated pose of the HMD 100/200 (e.g., by comparing the two sets of pose data), the compositor 308 may determine re-projection adjustments and apply those re-projection adjustments to the pixel data during the rendering workload 306(1) to modify the pixel data for frame F. The modified pixel data for frame F is output to a frame buffer and is scanned out during the scan out time 316(1) to present an image corresponding to frame F (as modified with re-projection adjustments) on the display panel(s) 104 of the HMD 100/200 at the illumination time 314(1). During the scan out time 316, subsets of pixel values (pixel data) for frame F are scanned out to the display panel(s) 104 via a display port (e.g., a high-definition multimedia interface (HDMI)), in sequence. During the illumination time 314, the light emitting elements 106/206 of the display panel(s) 104 are illuminated to cause the pixels to illuminate. The illumination can be a global flashing of all of the light emitting elements 106/206 simultaneously, or a rolling illumination of subsets of light emitting elements 106/206 in sequence. In either case, the illumination is considered herein as a pulse of light 108/208 for the given frame.

The graphics logic of the HMD 100/200 (or display system) may be asynchronous, or synchronous. In an asynchronous system, the compositor 308 runs separate (on a separate, asynchronous thread) from the application 304 on a graphics processing unit (GPU) of the HMD 100/200 (display system, or HMD system). For instance, the application 304 may call a function to receive pose data from the compositor 308, and the compositor 308 may provide the application 304 with the requested pose data (predicted for the predicted illumination time 314(1) for frame F) so that the application 304 can render the frame 302(1) (e.g., frame F) according to the pose data, which corresponds to a virtual camera pose used to render the scene. Because a variable refresh rate is supported, the compositor's workload 306 starts after the application 304 finishes rendering the frame 302 (the application render time 312 being variable). The compositor 308 may be configured to take the frame 302 (e.g., left and right images) from the application 304 and distort the frame 302 into the back buffers onto the display panel(s) 104/204 of the HMD 100/200. During this workload 306 of the compositor 308, re-projection adjustments can be applied.

By dynamically matching the refresh rate to the frame rate of the application 304, a newly-rendered frame 302 is received from the application 304 for each screen refresh, and an image corresponding to a given frame 302 can be presented with merely small-scale re-projection adjustments, if any. The degree of re-projection adjustments will be minimized if the predicted application render times 312 are accurate. Even with inaccurate predictions of the application render time 312, and thus, inaccurate pose predictions, the amount of re-projection will be small due to the variable refresh rate capabilities of the display system, which means that unwanted visual artifacts caused by re-projection with respect to moving or animating objects will be mitigated.

The processes described herein are illustrated as a collection of blocks in a logical flow graph, which represent a sequence of operations that can be implemented in hardware, software, firmware, or a combination thereof (i.e., logic). In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 4:
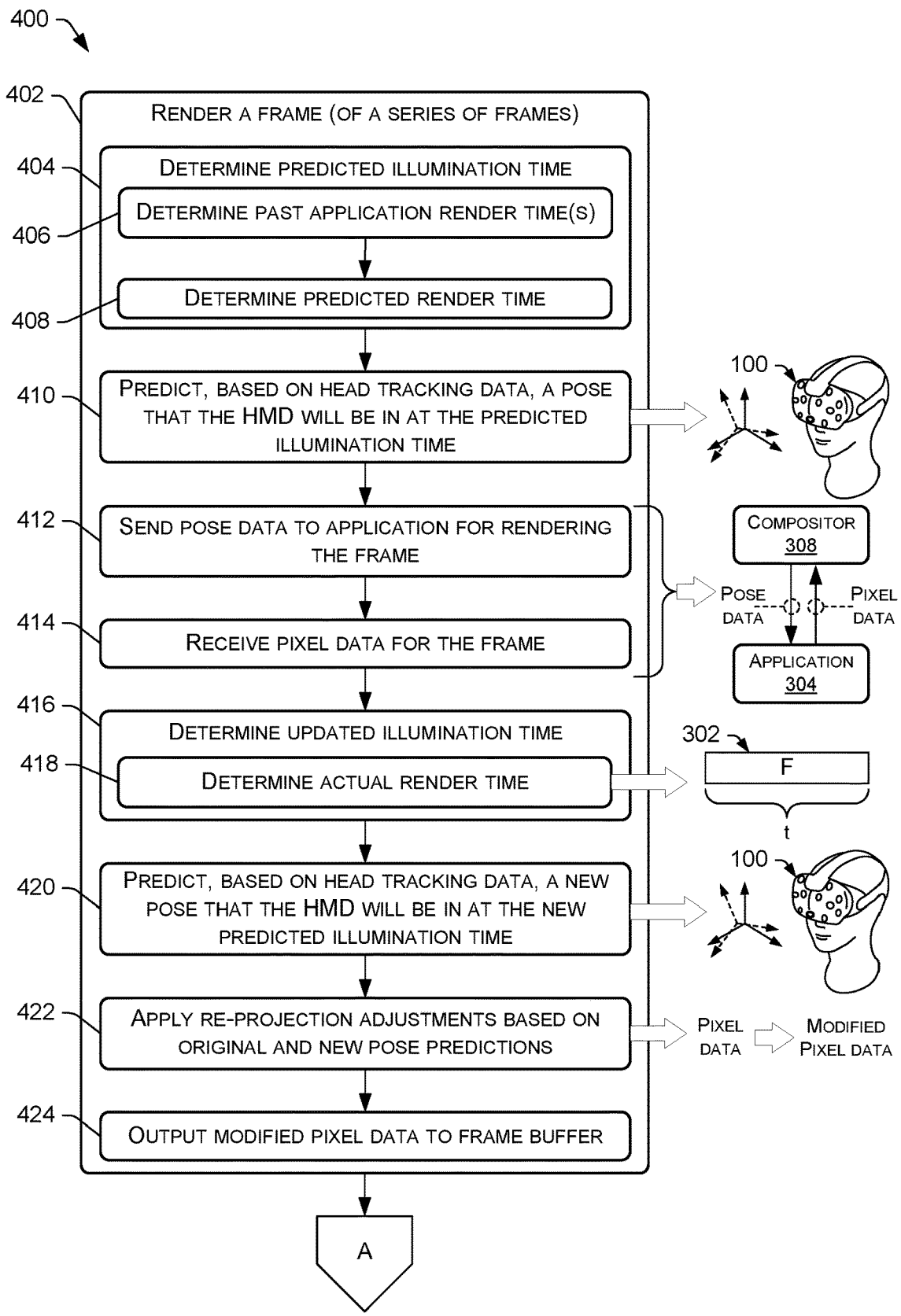
FIG. 4 illustrates a flow diagram of an example process for rendering a frame with re-projection in a low-persistence, variable refresh rate display system, in accordance with embodiments disclosed herein.

FIG. 4 illustrates a flow diagram of an example process 400 for rendering a frame with re-projection in a low-persistence, variable refresh rate display system, in accordance with embodiments disclosed herein. For discussion purposes, the process 400 is described with reference to the previous figures.

At 402, a frame 302, of a series of frames, may be rendered for presenting a corresponding image on a display panel 104/204 of a HMD 100/200. For discussion purposes, this frame 302 is referred to as a first frame 302(1). If the HMD 100/200 includes a pair of display panels, the first frame 302(1) may be rendered for presenting a first image on the left display panel 104/204 and a second image on the right display panel 104/204, or vice versa. As shown by the various sub-blocks within 402, there may be various sub-operations that are performed by the logic of the HMD 100/200 (or HMD system) for purposes of rendering the first frame 302(1) at block 402.

At sub-block 404, the logic of a HMD 100/200 (or HMD system) (e.g., logic including the compositor 308) may determine a predicted illumination time 314(1) for the first frame 302(1). Prior to this illumination time prediction, the application 304 can make a call to the compositor 308 asking for a pose of the HMD 100/200 so that the application 304 can render the first frame 302(1) appropriately for that HMD pose. The predicted illumination time 314 determined at sub-block 404 may represent a time at which the light emitting elements 106/206 will illuminate for the first frame 302(1). In other words, the illumination time prediction at sub-block 404 is a prediction of when light will actually reach the eye(s) of the user 102/202 when an image corresponding to the first frame 302(1) is presented on the display panel(s) 104/204 of the HMD 100/200. As shown by sub-blocks 406 and 408 within sub-block 404, there may be various sub-operations that are performed by the logic of the HMD 100/200 (or HMD system) for purposes of determining the predicted illumination time 314(1) at sub-block 404.

At sub-block 406, the logic of a HMD 100/200 (or HMD system) (e.g., logic including the compositor 308) may determine a first amount of time(s) the application 304 spent rendering a preceding frame(s) 302.

At sub-block 408, the logic may determine, based at least in part on the first amount of time determined at sub-block 406, a predicted render time 312(1) representing an amount of time the application 304 will spend rendering the first frame 302(1) (because the application render time 312 is variable over a series of frames 302, depending on scene complexity, and/or the current load on the processing resources, etc.). In an example, if the application 304 spent 11 ms rendering the preceding frame 302, the predicted render time 312(1) determined at sub-block 408 can be the same amount of time: 11 ms. This is based on the notion that it is reasonably safe to assume that the upcoming frame 302 will take as long to render as the preceding frame 302 took to render. The predicted render time 312(1) determined at sub-block 408 may be in the form of a predicted time at which the application 304 will finish rendering the first frame 302(1), or it may be in the form of a predicted amount of time the application 304 will take to render the first frame 302(1) (e.g., from start to finish). Thus, sub-blocks 406 and 408 illustrate how a prediction of the application render time 312(1) for the first frame 302(1) can be based on one or more historical render times 312 of previous frames 302 (i.e., the frame(s) 302 that came before the first frame 302(1)). It is to be appreciated, however, that the prediction of the application render time 312(1) may be based on various other factors, such as scene complexity, current processing load, etc.

As a brief aside, although the application render time 312(1) (i.e., the amount of time for the application 304 to render the first frame 302(1)) is variable, the scan-out time 316(1) for the first frame 302(1) is fixed, and the scan out time 316(1) plus the illumination time 314(1) may correspond to the fastest frame rate among the range of possible frame rates. Thus, if the frame rate is pushed, on the high end, to, say, 144 Hz for a variable refresh rate display, the pixel data is scanned out and an image is presented on the display for each frame 302 roughly every 6.9 ms. In other words, it should take about 6.9 ms (for a display system capable of achieving a 144 Hz refresh rate on the high end) to scan out the pixel data from the frame buffer and illuminate the pixels on the display for a given frame 302. The illumination time 314(1) (which is technically a time period) that occurs after the pixel data is scanned out, is very short, by comparison to both the application render time 312(1) and the scan out time 316(1). The illumination time 314(1) also includes a settling time. For example, for LCDs, the crystal often takes a few extra ms to settle, so the light emitting elements 106/206 are illuminated after the crystal settles. Some or all of these time periods can be considered in order to determine the predicted illumination time 314(1) at sub-block 404. At the very least, because the frame rate is variable, the predicted illumination time 314(1) is determined based at least in part on a predicted application render time 312(1) for the first frame 302(1). In some embodiments, such as with a rolling band type of display driving scheme, the illumination time prediction at sub-block 404 may be based on a prediction of where, on the display panel 104/204, the user 102/202 will be looking, which may be determined from eye tracking data generated by an eye tracking system of the HMD 100/200.

At sub-block 406, in some embodiments, the logic may determine application render times 312 for multiple previous frames 302, and may determine an average application render time 312 based on these historical render times to predict the application render time 312(1) for the first frame 302(1). For example, the logic may determine a first amount of time the application 304 spent rendering the preceding frame 302, and a second amount of time the application 304 spent rendering a previous frame 302 that preceded the preceding frame 302, and then an average render time 312 may be determined based on the first amount of time and the second amount of time. The number of previous frames 302 to consider for this running average render time calculation is configurable (e.g., calculate an average render time 312 based on the render times 312 of the ten most recently rendered (previous) frames 302). Taking an average like this may provide the benefit of not reacting to anomalous render times, and, instead, waiting for the render time to settle a bit before adjusting the illumination time prediction.

At sub-block 410, the logic (e.g., compositor 308) may determine a predicted a pose that the HMD 100/200 will be in at the predicted illumination time 314(1) that was determined at sub-block 404. This is the original prediction of the pose of the HMD 100/200 for the first frame 302(1), and it may be based at least in part on head tracking data generated by the head tracking system of the HMD 100/200 (or HMD system).

At sub-block 412, the logic (e.g., compositor 308) may send, to the application 304 for purposes of rendering the first frame 302(1), pose data indicative of the pose predicted at sub-block 410.

At sub-block 414, the logic (e.g., compositor 308) may receive, from the application 304, pixel data for the first frame 302(1). The pixel data may include pixel values, as described herein, for individual pixels in the array of pixels of the display panel 104/204.

At sub-block 416, the logic (e.g., compositor 308) may determine, based at least in part on the actual amount of time the application 304 spent rendering the first frame 302(1), an updated illumination time 314(1) representing the time at which the light emitting elements 106/206 will illuminate for the first frame 302(1). The actual render time 312 of the first frame 302(1) (which can be determined at sub-block 418) might be less than the originally-predicted render time 312, in which case, the compositor 308 receives the pixel data from the application 304 sooner than predicted. The actual render time 312 of the first frame 302(1) might be greater than the originally-predicted render time 312, in which case, the compositor 308 receives the pixel data from the application 304 later than predicted. The predicted application render time 312 may have been accurate, meaning that the pixel data was received exactly when it was predicted to be received, but in many cases, there may be a delta, albeit a small one, between the predicted render time and the actual render time for the first frame 302(1).

At sub-block 420, the logic (e.g., compositor 308) may determine, based at least in part on the head tracking data generated by the head tracking system of the HMD 100/200, an updated pose that the HMD 100/200 will be in at the updated illumination time 314(1). The delta between the original pose prediction and the updated pose prediction depends on the accuracy of the application render time 312 prediction. However, as indicated, this delta is likely to be small given the relatively short time periods at play.

At sub-block 422, the logic (e.g., compositor 308) may apply re-projection adjustments to the pixel data for the first frame 302(1) to obtain modified (first) pixel data associated with the first frame 302(1). In the diagram of FIG. 3, this may occur during the compositor's 308 rendering workload 306(1) after receiving the pixel data for the first frame 302(1) from the application 304. The re-projection adjustments may be determined based at least in part on the original predicted pose (determined at sub-block 410) and the updated pose (determined at sub-block 420), such as by comparing the two sets of pose data to determine an offset(s). In an illustrative example, the compositor 308 may receive the pixel data for the first frame 302(1) one or two ms earlier than predicted, or one or two ms later than predicted. Because the pixel data is to be output to the frame buffer(s) and scanned out to the display as fast as possible, the updated prediction of the illumination time 314(1) may be slightly different (e.g., on the order of one or two ms different) than the originally-predicted illumination time 314(1), and the HMD pose prediction can be updated based on this slight delta to determine the reprojection adjustments that are to be made to the pixel data.

At sub-block 424, the logic (e.g., compositor 308) may output the modified (first) pixel data for the first frame 302(1) to a frame buffer(s). Again, for a HMD 100/200 with a pair of display panels 104/204, this pixel data may correspond to a frame that represents a pair of images to be displayed on the pair of display panels 104/204. As shown by the off-page reference "A", the process 400 may continue to the first block of process 500 shown in FIG. 5.

Figure 5:
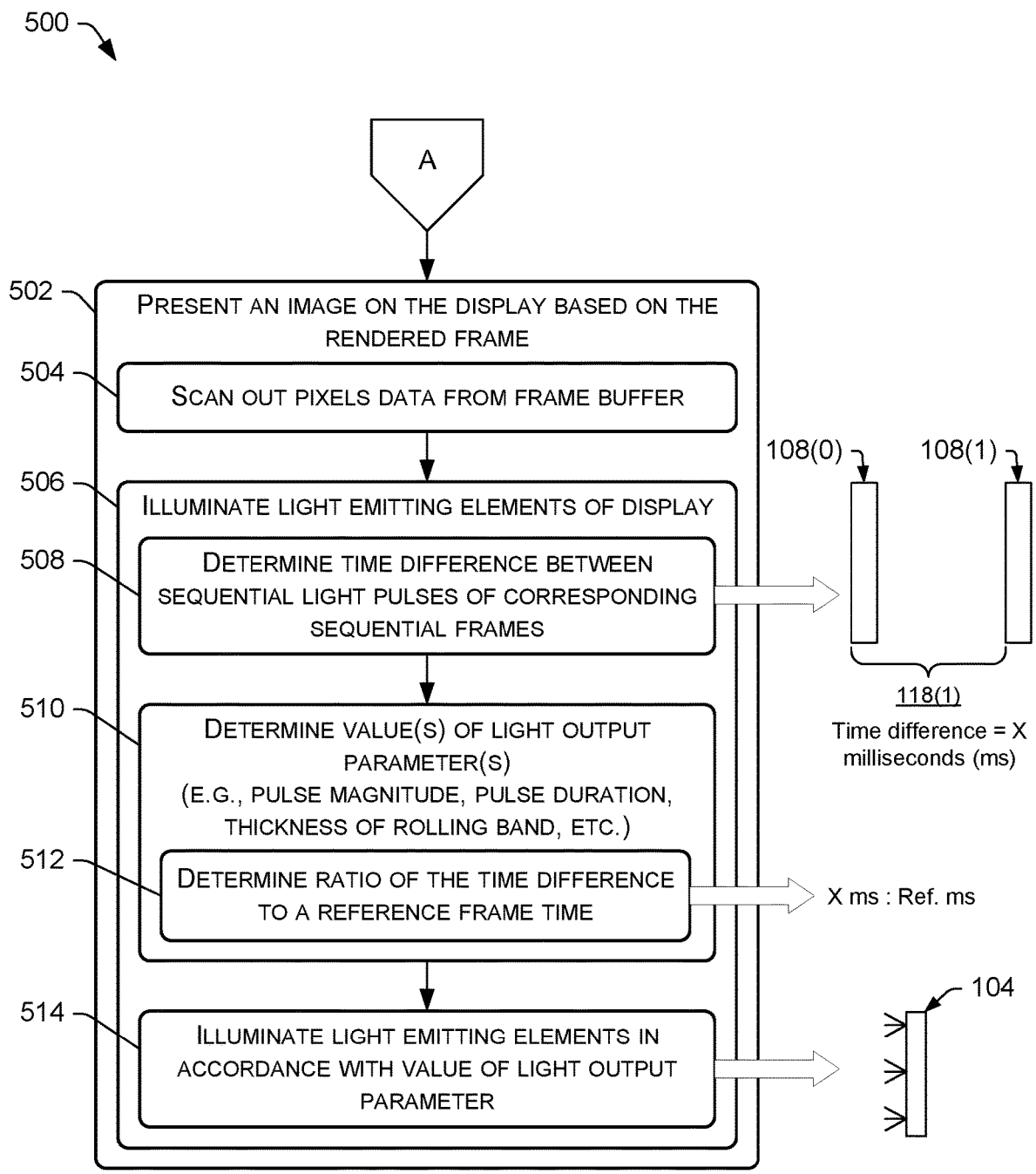
FIG. 5 illustrates a flow diagram of an example process for dynamically determining a value of a light output parameter for illuminating a low-persistence, variable refresh rate display during presentation of an image, in accordance with embodiments disclosed herein.

FIG. 5 illustrates a flow diagram of an example process 500 for dynamically determining a value of a light output parameter for illuminating a low-persistence, variable refresh rate display during presentation of an image, in accordance with embodiments disclosed herein. As shown by the off-page reference "A" in FIGS. 4 and 5, the process 500 may continue from the process 400. The process 500 can also be performed independently based on any pixel data output to the frame buffer(s). For discussion purposes, the process 500 is described with reference to the previous figures.

At 502, logic (e.g., a display controller, display driver circuitry, etc.) of a display system, such as a HMD 100/200 (or HMD system) may cause an image to be presented on a display based at least in part on pixel data for a frame 302 that was rendered by the application 304, possibly with re-projection, as described in the process 400 of FIG. 4. For discussion purposes, and continuing with the example discussed in FIG. 4, the image is referred to as a first image that corresponds to first pixel data of the first frame 302(1). As shown by the sub-blocks 504 and 506, the presentation of the image at block 502 may include one or more sub-operations.

At sub-block 504, for example, the modified (first) pixel data for the first frame 302(1) may be scanned out on the display panel 104/204 of the display system. For example, the pixel values for individual rows of pixels may be sequentially scanned out to the display panel(s) 104/204 via a display port (e.g., a HDMI), starting with a first subset (e.g., row) of pixels and ending with a last subset (e.g., row) of pixels.

At sub-block 506, the light emitting elements 106/206 of the display may be illuminated during presentation of the first image on the display. The illumination may occur by emitting a light pulse 108/208. That is, a low-persistence display system may pulse the light emitting elements 106/206 on-and-off over a series of frames at a refresh rate of the display, which, as described herein, may be variable. As described herein, the pulse of light during the illumination at sub-block 506 may be a global flash of illumination where the light emitting elements 106/206 simultaneously illuminate, or a rolling band of illumination where individual subsets of the light emitting elements 106/206 illuminate in sequence during the light pulse 108/208. As shown by sub-blocks 508-514, a value of a light output parameter(s) may be determined for illuminating the light emitting elements 106/206 during presentation of the first image such that, over the series of frames, the brightness of the display remains constant.

At sub-block 508, the logic of the display system (e.g., the HMD 100/200) may determine a first time difference 118(1)/218(1) between a light pulse 108(0) (or, an illumination) of the light emitting elements 106/206 for a preceding frame 302 of the series of frames and an upcoming light pulse 108(1) (or, an illumination) of the light emitting elements 106/206 for the first frame 302(1). The first time difference 118(1)/218(1) may be referred to herein as the current frame time, and it may be derivable from the current refresh rate of the display. In an illustrative example, consider a first time difference 118(1)/218(1) (or, a current frame time) of 8.3 ms, which is indicative of an instantaneous refresh rate of 120 Hz. It is to be appreciated that determining the first time difference 118(1)/218(1) between a sequential pair of light pulses 108/208 corresponding to a sequential pair of frames 302 may include determining a time difference between any two corresponding points between the pair of light pulses 108/208 or the pair of frames. For example, the time difference 118/218 between the start of each light pulse 108/208, the midpoint of each light pulse 108/208, the end of each light pulse 108/208, etc. can be determined. The display system logic may, in some embodiments, include start-of-frame markers in the pixel data between each application-rendered frame, and these start-of-frame markers can be used to determine the first time difference 118(1)/218(1) at sub-block 508.

At sub-block 510, the logic of the display system (e.g., the HMD 100/200) may determine a first value(s) of a light output parameter(s) based at least in part on the first time difference 118(1)/218(1). As described herein, a value of a light output parameter may correspond to a magnitude of the light pulse 108(1) for the first frame 302(1). A value of another light output parameter may correspond to a duration of the light pulse 108(1) for the first frame 302(1). In a rolling band type of display driving scheme, a value of a light output parameter may correspond to a number of the light emitting elements 106/206 that are simultaneously illuminated during the light pulse 108(1) (e.g., a thickness of the rolling band of illumination). In some embodiments, multiple of these light output parameters may be determined and applied in combination to control the light output.

At sub-block 512, as part of determining the first value(s) of the light output parameter(s), the logic may determine a ratio of the first time difference 118(1)/218(1) to a reference frame time 112/212. As described herein, a reference frame time 112/212 may be a time corresponding to an intermediate frame rate between a minimum frame rate and a maximum frame rate of a range of frame rates targeted by the application 304. For example, if the application 304 targets a range of frame rates between 45 FPS and 144 FPS, a reference frame time used to determine the aforementioned ratio may correspond to the frame time at a frame rate of 90 FPS, which is a frame time of roughly 11.11 ms. In this example, the reference frame time 112/212 would be 11.11 ms. However, this is merely an example, and the reference frame time 112/212 is configurable based in part on the specifications of the display system in which the techniques described herein are implemented. In the illustrative example, if the first time difference 118(1)/218(1) (or, a current frame time) is 8.3 ms, and the reference frame time 112/212 is 11.11 ms, the ratio determined at sub-block 512 would be about 0.75. This can be thought of a light output factor that is 75% of the nominal light output at the reference frame rate 112/212, which means that the light output is to be decreased in some way (whether that is a decrease in magnitude or a duration of the light pulse 108(1), etc.). In any case, the first value(s) of the light output parameter(s) may be determined based at least in part on this ratio.

At sub-block 514, the light emitting elements 106/206 may be controlled to emit a light pulse 108(1) (or, illuminate) in accordance with the first value(s) of the light output parameter(s) during presentation of the first image on the display. This process 500 may iterate over a series of frames by dynamically determining a value(s) of the light output parameter(s) for each frame 302 of a series of frames. As a result of varying the light output parameter(s) in this way over a series of frames 302, the display brightness remains substantially constant over the series of frames, thereby eliminating, or at least mitigating, flickering of the display.

Figure 6:
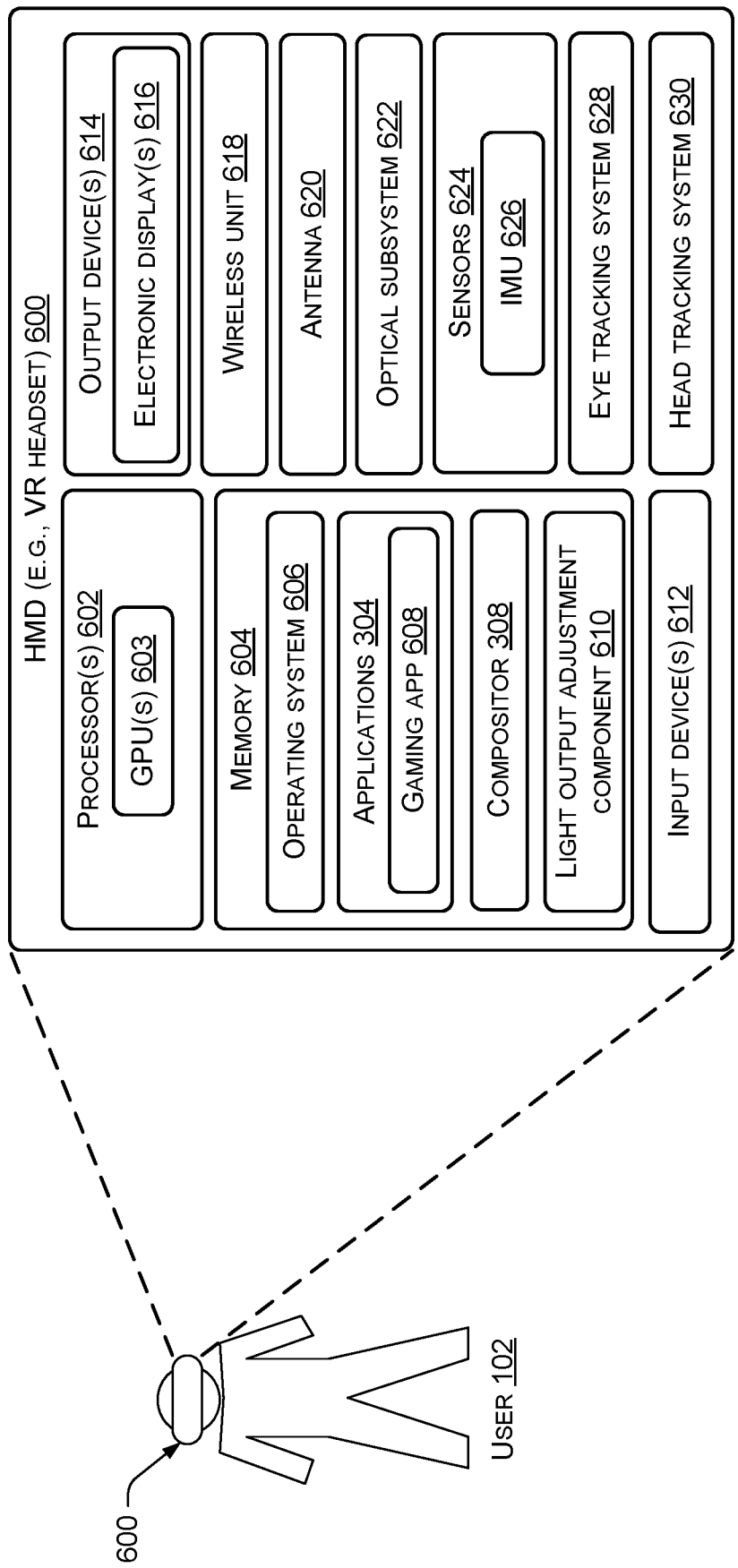
FIG. 6 illustrates example components of a system including a wearable device, such as a VR headset, in which the techniques disclosed herein can be implemented.

FIG. 6 illustrates example components of a HMD 600 (or a HMD system that includes the HMD 600), such as a VR headset, according to the embodiments disclosed herein may be embedded. The HMD 600 may be the same as, or similar to, the HMD 100/200 referenced in the previous figures, and, therefore, the components of the HMD 600 shown in FIG. 6 may be implemented in the HMD 100/200. The HMD 600 may be implemented as a standalone device that is to be worn by a user 102 (e.g., on a head of the user 102). In some embodiments, the HMD 600 may be head-mountable, such as by allowing a user 102 to secure the HMD 600 on his/her head using a securing mechanism (e.g., an adjustable band) that is sized to fit around a head of a user 102. In some embodiments, the HMD 600 comprises a virtual reality (VR) or augmented reality (AR) headset that includes a near-eye or near-to-eye display(s). As such, the terms "wearable device", "wearable electronic device", "VR headset", "AR headset", and "head-mounted display (HMD)" may be used interchangeably herein to refer to the device 600 of FIG. 6. However, it is to be appreciated that these types of devices are merely example of a HMD 600, and it is to be appreciated that the HMD 600 may be implemented in a variety of other form factors. It is also to be appreciated that some or all of the components shown in FIG. 6 may be implemented on the HMD 600. Accordingly, in some embodiments, a subset of the components shown in FIG. 6 may be implemented on a computing device that is part of the HMD system, but is separate from the HMD 600 itself, such as a PC, a game console, or any other suitable computing device. It is also to be appreciated that a non-HMD system may include some similar components to implement at least the dynamic light output adjustment techniques and processes described herein.

In the illustrated implementation, the HMD 600 includes one or more processors 602 and memory 604 (e.g., computer-readable media 604). In some implementations, the processors(s) 602 may include a central processing unit (CPU), a graphics processing unit (GPU)(s) 603, both CPU and GPU 603, a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 602 may possess its own local memory, which also may store program modules, program data, and/or one or more operating systems.

The memory 604 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 604 may be implemented as computer-readable storage media ("CRSM"), which may be any available physical media accessible by the processor(s) 602 to execute instructions stored on the memory 602. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 602.

In general, the HMD 600 (or HMD system) may include logic (e.g., software, hardware, and/or firmware, etc.) that is configured to implement the techniques, functionality, and/or operations described herein. The computer-readable media 604 is shown as including various modules, such as instruction, datastores, and so forth, which may be configured to execute on the processor(s) 602 for carrying out the techniques, functionality, and/or operations described herein. A few example functional modules are shown as stored in the computer-readable media 604 and executable on the processor(s) 602, although the same functionality may alternatively be implemented in hardware, firmware, or as a system on a chip (SOC), and/or other logic.

An operating system module 606 may be configured to manage hardware within and coupled to the HMD 600 for the benefit of other modules. In addition, in some instances the HMD 600 may include one or more applications 304 stored in the memory 604 or otherwise accessible to the HMD 600. In this implementation, the application(s) 304 includes a gaming application 608. However, the HMD 600 may include any number or type of applications and is not limited to the specific example shown here. The gaming application 608 may be configured to initiate gameplay of a video-based, interactive game (e.g., a VR game) that is playable by the user 102, and to output frames 302 to be rendered on the display panels of the HMD 600. A compositor 308, in combination with other logic of the HMD 600, may be configured to perform the techniques described herein to render a frame 302 with re-projection, such as by implementation of the process 400. A light output adjustment component 610, in combination with other logic of the HMD 600, may be configured to perform the techniques described herein to dynamically adjust the light output of the light emitting elements 106/206 based on a time difference between sequential light pulses 108/208 corresponding to sequential frames 302.

Generally, the HMD 500 has input devices 612 and output devices 614. The input devices 612 may include control buttons. In some implementations, one or more microphones may function as input devices 612 to receive audio input, such as user voice input. In some implementations, one or more cameras or other types of sensors (e.g., inertial measurement unit (IMU)) may function as input devices 612 to receive gestural input, such as a hand and/or head motion of the user 102. In some embodiments, additional input devices 612 may be provided in the form of a keyboard, keypad, mouse, touch screen, joystick, handheld controller, and the like. In other embodiments, the HMD 600 may omit a keyboard, keypad, or other similar forms of mechanical input. Instead, the HMD 600 may be implemented relatively simplistic forms of input device 612, a network interface (wireless or wire-based), power, and processing/memory capabilities. For example, a limited set of one or more input components may be employed (e.g., a dedicated button to initiate a configuration, power on/off, etc.) so that the HMD 600 can thereafter be used. In one implementation, the input device(s) 612 may include control mechanisms, such as basic volume control button(s) for increasing/decreasing volume, as well as power and reset buttons.

The output devices 614 may include a display(s) 616, which may include one or multiple display panels 104/204 (e.g., a stereo pair of display panels 104/204) including the light emitting elements 106/206, as described herein. The output devices 614 may further include, without limitation, a light element (e.g., LED), a vibrator to create haptic sensations, a speaker(s) (e.g., headphones), and/or the like. There may also be a simple light element (e.g., LED) to indicate a state such as, for example, when power is on.

The HMD 600 may further include a wireless unit 618 coupled to an antenna 620 to facilitate a wireless connection to a network. The wireless unit 618 may implement one or more of various wireless technologies, such as Wi-Fi, Bluetooth, radio frequency (RF), and so on. It is to be appreciated that the HMD 600 may further include physical ports to facilitate a wired connection to a network, a connected peripheral device (including a PC, game console, etc.), or a plug-in network device that communicates with other wireless networks, and which may be part of the HMD system.

The HMD 600 may further include optical subsystem 622 that directs light from the electronic display(s) 616 to a user's eye(s) using one or more optical elements. The optical subsystem 622 may include various types and combinations of different optical elements, including, without limitations, such as apertures, lenses (e.g., Fresnel lenses, convex lenses, concave lenses, etc.), filters, and so forth. In some embodiments, one or more optical elements in optical subsystem 622 may have one or more coatings, such as anti-reflective coatings. Magnification of the image light by optical subsystem 622 allows electronic display(s) 616 to be physically smaller, weigh less, and consume less power than larger displays. Additionally, magnification of the image light may increase a field of view (FOV) of the displayed content (e.g., images). For example, the FOV of the displayed content is such that the displayed content is presented using almost all (e.g., 120-150 degrees diagonal), and in some cases all, of the user's FOV. AR applications may have a narrower FOV (e.g., about 40 degrees FOV). Optical subsystem 622 may be designed to correct one or more optical errors, such as, without limitation, barrel distortion, pincushion distortion, longitudinal chromatic aberration, transverse chromatic aberration, spherical aberration, comatic aberration, field curvature, astigmatism, and so forth. In some embodiments, content provided to electronic display(s) 616 for display is pre-distorted, and optical subsystem 622 corrects the distortion when it receives image light from electronic display(s) 616 generated based on the content.

The HMD 600 may further include one or more sensors 624, such as sensors used to generate motion, position, and orientation data. These sensors 624 may be or include gyroscopes, accelerometers, magnetometers, video cameras, color sensors, or other motion, position, and orientation sensors. The sensors 624 may also include sub-portions of sensors, such as a series of active or passive markers that may be viewed externally by a camera or color sensor in order to generate motion, position, and orientation data. For example, a VR headset may include, on its exterior, multiple markers, such as reflectors or lights (e.g., infrared or visible light) that, when viewed by an external camera or illuminated by a light (e.g., infrared or visible light), may provide one or more points of reference for interpretation by software in order to generate motion, position, and orientation data. The HMD 600 may include light sensors that are sensitive to light (e.g., infrared or visible light) that is projected or broadcast by base stations in the environment of the HMD 600.

In an example, the sensor(s) 624 may include an inertial measurement unit (IMU) 626. IMU 626 may be an electronic device that generates calibration data based on measurement signals received from accelerometers, gyroscopes, magnetometers, and/or other sensors suitable for detecting motion, correcting error associated with IMU 626, or some combination thereof. Based on the measurement signals such motion-based sensors, such as the IMU 626, may generate calibration data indicating an estimated position of HMD 600 relative to an initial position of HMD 600. For example, multiple accelerometers may measure translational motion (forward/back, up/down, left/right) and multiple gyroscopes may measure rotational motion (e.g., pitch, yaw, and roll). IMU 626 can, for example, rapidly sample the measurement signals and calculate the estimated position of HMD 600 from the sampled data. For example, IMU 626 may integrate measurement signals received from the accelerometers over time to estimate a velocity vector and integrates the velocity vector over time to determine an estimated position of a reference point on HMD 600. The reference point is a point that may be used to describe the position of the HMD 600. While the reference point may generally be defined as a point in space, in various embodiments, reference point is defined as a point within HMD 600 (e.g., a center of the IMU 626). Alternatively, IMU 626 provides the sampled measurement signals to an external console (or other computing device), which determines the calibration data.

The sensors 624 may operate at relatively high frequencies in order to provide sensor data at a high rate. For example, sensor data may be generated at a rate of 1000 Hz (or 1 sensor reading every 1 millisecond). In this way, one thousand readings are taken per second. When sensors generate this much data at this rate (or at a greater rate), the data set used for predicting motion is quite large, even over relatively short time periods on the order of the tens of milliseconds.

As mentioned, in some embodiments, the sensors 624 may include light sensors that are sensitive to light emitted by base stations in the environment of the HMD 600 for purposes of tracking position and/or orientation, pose, etc., of the HMD 600 in 3D space. The calculation of position and/or orientation may be based on timing characteristics of light pulses and the presence or absence of light detected by the sensors 624.

The HMD 600 may further include an eye tracking system 628 that generates eye tracking data. The eye tracking system 628 may include, without limitation, a camera or other optical sensor inside HMD 600 to capture image data (or information) of a user's eyes, and the eye tracking system 628 may use the captured data/information to determine motion vectors, interpupillary distance, interocular distance, a three-dimensional (3D) position of each eye relative to HMD 600, including a magnitude of torsion and rotation (i.e., roll, pitch, and yaw) and gaze directions for each eye. In one example, infrared light is emitted within HMD 600 and reflected from each eye. The reflected light is received or detected by a camera of the eye tracking system 628 and analyzed to extract eye rotation from changes in the infrared light reflected by each eye. Many methods for tracking the eyes of a user 102 can be used by eye tracking system 628. Accordingly, eye tracking system 628 may track up to six degrees of freedom of each eye (i.e., 3D position, roll, pitch, and yaw) and at least a subset of the tracked quantities may be combined from two eyes of a user 102 to estimate a gaze point (i.e., a 3D location or position in the virtual scene where the user is looking), which may map to a location(s) on the display panel(s) 104/204 for predicting where the user 102 will be looking in terms of an individual subset (e.g., a row) or a group of contiguous subsets (e.g., a group of contiguous rows) of the pixels of the display panel(s) 104/204. For example, eye tracking system 628 may integrate information from past measurements, measurements identifying a position of a user's 102 head, and 3D information describing a scene presented by electronic display(s) 616. Thus, information for the position and orientation of the user's 102 eyes is used to determine the gaze point in a virtual scene presented by HMD 600 where the user 102 is looking, and to map that gaze point to a location(s) on the display panel(s) 104/204 of the HMD 600. Motion vectors may be utilized to predict a trajectory of eye movement, and the like.

The HMD 600 may further include a head tracking system 630. The head tracking system 630 may leverage one or more of the sensor 624 to track head motion, including head rotation, of the user 102, as described above. For example, the head tracking system 630 can track up to six degrees of freedom of the HMD 600 (i.e., 3D position, roll, pitch, and yaw). These calculations can be made at every frame 302 of a series of frames 302 so that the application 304 can determine how to render a scene in the next frame 302 in accordance with the head position and orientation, and so that the compositor 308 can make re-projection adjustment computations. In some embodiments, the head tracking system 630, and/or the compositor 308 using the head tracking system 630, is configured to predict a future pose (position and/or orientation) of the HMD 600 based on current and/or past data, and/or based on the known/implied scan out latency of the individual subsets of pixels in a display system that implements a rolling band display driving technique, as described herein. This is because the application 304 is asked to render a frame 302 before the user 102 actually sees the light (and, hence, the image) on the display(s) 616. Accordingly, a next frame 302 can be rendered based on this future prediction of head position and/or orientation that was made at an earlier point in time, which may be roughly within the range of 12-30 milliseconds (ms) prior to rendering the frame 302, depending on the instantaneous frame rate and/or refresh rate. Rotation data provided by the head tracking system 630 can be used to determine both direction of HMD 600 rotation, and amount of HMD 600 rotation in any suitable unit of measurement.

For example, rotational direction may be simplified and output in terms of positive or negative horizontal and positive or negative vertical directions, which correspond to left, right, up, and down. Amount of rotation may be in terms of degrees, radians, etc. Angular velocity may be calculated to determine a rate of rotation of the HMD 600.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A display system comprising:
    a display having an array of light emitting elements, the display configured to support a variable refresh rate;
    one or more processors; and
    memory storing computer-executable instructions that, when executed by the one or more processors, cause the display system to:
        output, to a frame buffer, first pixel data associated with a first frame of a series of frames;
        determine a first time difference between an illumination of the light emitting elements for a preceding frame of the series of frames and an upcoming illumination of the light emitting elements for the first frame;
        determine a ratio of the first time difference to a reference frame time;
        determine a first value of a light output parameter based at least in part on the ratio;
        present a first image on the display based at least in part on the first pixel data; and
        illuminate the light emitting elements in accordance with the first value of the light output parameter during presentation of the first image on the display.

2. The display system of claim 1, wherein the computer-executable instructions, when executed by the one or more processors, further cause the display system to:
    output, to the frame buffer, second pixel data associated with a second frame of the series of frames;
    determine a second time difference between an illumination of the light emitting elements for the first frame and an upcoming illumination of the light emitting elements for the second frame;
    determine a second value of the light output parameter based at least in part on the second time difference;
    present a second image on the display based at least in part on the second pixel data; and
    illuminate the light emitting elements in accordance with the second value of the light output parameter during presentation of the second image on the display,
    wherein:
        the second time difference is greater than the first time difference; and
        the second value of the light output parameter causes the light emitting elements to emit light at a greater luminance, or for a longer duration, than the first value of the light output parameter, or
    wherein:
        the second time difference is less than the first time difference; and
        the second value of the light output parameter causes the light emitting elements to emit light at a lesser luminance, or for a shorter duration, than the first value of the light output parameter.

3. The display system of claim 1, wherein the first value of the light output parameter corresponds to at least one of:
    a magnitude of a pulse of light for illuminating the light emitting elements;
    a duration of the pulse of light for illuminating the light emitting elements; or
    a number of the light emitting elements that are simultaneously illuminated while illuminating individual subsets of the light emitting elements in sequence during the presentation of the first image on the display.

4. The display system of claim 1, wherein an application that rendered the first frame is configured to target a frame rate within a range of frame rates from a minimum frame rate to a maximum frame rate, and wherein the reference frame time corresponds to an intermediate frame rate between the minimum frame rate and the maximum frame rate.

5. The display system of claim 1, wherein the display is a head-mounted display (HMD), the display system further comprising a head tracking system, wherein the computer-executable instructions, when executed by the one or more processors, further cause the display system to, prior to outputting the first pixel data to the frame buffer:
    determine a predicted illumination time representing a time at which the light emitting elements will illuminate for the first frame;
    determine, based at least in part on head tracking data generated by the head tracking system, a predicted pose that the HMD will be in at the predicted illumination time;
    send pose data indicative of the predicted pose to an application for rendering the first frame;
    receive, from the application, pixel data for the first frame;
    determine, based at least in part on an amount of time the application spent rendering the first frame, an updated illumination time representing the time at which the light emitting elements will illuminate for the first frame;
    determine, based at least in part on the head tracking data generated by the head tracking system, an updated pose that the HMD will be in at the updated illumination time; and
    apply, based at least in part on the predicted pose and the updated pose, re-projection adjustments to the pixel data to obtain the first pixel data associated with the first frame.

6. The display system of claim 5, wherein determining the predicted illumination time comprises:
    determining a first amount of time the application spent rendering the preceding frame; and
    determining, based at least in part on the first amount of time, a predicted render time representing an amount of time the application will spend rendering the first frame,
    wherein the predicted illumination time is determined based at least in part on the predicted render time.

7. The display system of claim 6, wherein the computer-executable instructions, when executed by the one or more processors, further cause the display system to:
    determine a second amount of time the application spent rendering a previous frame that preceded the preceding frame; and
    determine an average render time based at least in part on the first amount of time and the second amount of time,
    wherein the determining the predicted render time is based at least in part on the average render time.

8. The display system of claim 1, wherein the display system is at least one of a virtual reality (VR) display system or an augmented reality (AR) display system.

9. A method implemented by a display system that includes a display having an array of light emitting elements, the method comprising:
   outputting first pixel data to a frame buffer, the first pixel data associated with a first frame of a series of frames;
   determining a first time difference between a light pulse of the light emitting elements for a preceding frame of the series of frames and an upcoming light pulse of the light emitting elements for the first frame;
   determining a ratio of the first time difference to a reference frame time;
   determining a first value of a light output parameter based at least in part on the ratio;
   presenting a first image on the display based at least in part on the first pixel data; and
   controlling the light emitting elements to emit a light pulse in accordance with the first value of the light output parameter during presentation of the first image on the display.

10. The method of claim 9, wherein the first value of the light output parameter corresponds to at least one of:
    a magnitude of the light pulse for the first frame;
    a duration of the light pulse for the first frame; or
    a number of the light emitting elements that are simultaneously illuminated during the light pulse for the first frame.

11. The method of claim 9, wherein the display is a head-mounted display (HMD), the method further comprising, prior to the outputting of the first pixel data to the frame buffer:
    determining a predicted illumination time representing a time at which the light pulse for the first frame will occur;
    determining, based at least in part on head tracking data generated by a head tracking system of the display system, a predicted pose that the HMD will be in at the predicted illumination time;
    sending pose data indicative of the predicted pose to an application for rendering the first frame;
    receiving, from the application, pixel data for the first frame;
    determining, based at least in part on an amount of time the application spent rendering the first frame, an updated illumination time representing the time at which the light pulse for the first frame will occur;
    determining, based at least in part on the head tracking data generated by the head tracking system, an updated pose that the HMD will be in at the updated illumination time; and
    applying, based at least in part on the predicted pose and the updated pose, re-projection adjustments to the pixel data to obtain the first pixel data associated with the first frame.

12. The method of claim 11, further comprising:
    determining a first amount of time the application spent rendering the preceding frame; and
    determining, based at least in part on the first amount of time, a predicted render time representing an amount of time the application will spend rendering the first frame,
    wherein the predicted illumination time is determined based at least in part on the predicted render time.

13. The method of claim 9, wherein the controlling the light emitting elements to emit the light pulse comprises at least one of:
    causing the light emitting elements to simultaneously emit light; or
    causing individual subsets of the light emitting elements to sequentially emit the light.

14. The method of claim 9, wherein an application that rendered the first frame is configured to target a frame rate within a range of frame rates from a minimum frame rate to a maximum frame rate, and wherein the reference frame time corresponds to an intermediate frame rate between the minimum frame rate and the maximum frame rate.

15. A system comprising:
    a display having an array of light sources;
    display driver circuitry coupled to the array of light sources; and
    one or more processors to:
       output first pixel data to a frame buffer, the first pixel data associated with a first frame of a series of frames;
       determine a first time difference between an illumination of the light sources for a preceding frame of the series of frames and an upcoming illumination of the light sources for the first frame;
       determine a ratio of the first time difference to a reference frame time;
       determine a first value of a light output parameter based at least in part on the ratio;
       present a first image on the display based at least in part on the first pixel data; and
       cause the display driver circuitry to illuminate the light sources in accordance with the first value of the light output parameter during presentation of the first image on the display.

16. The system of claim 15, wherein the first value of the light output parameter corresponds to at least one of:
    a magnitude of a pulse of light for illuminating the light sources;
    a duration of the pulse of light for illuminating the light sources; or
    a number of the light sources that are simultaneously illuminated while illuminating individual subsets of the light sources in sequence during the presentation of the first image on the display.

17. The system of claim 15, further comprising a head tracking system, wherein the display is a head-mounted display (HMD), and wherein the one or more processors are further configured to, prior to outputting the first pixel data to the frame buffer:
    determine a predicted illumination time representing a time at which the light sources will illuminate for the first frame;
    determine, based at least in part on head tracking data generated by the head tracking system, a predicted pose that the HMD will be in at the predicted illumination time;
    send pose data indicative of the predicted pose to an application for rendering the first frame;
    receive, from the application, pixel data for the first frame;
    determine, based at least in part on an amount of time the application spent rendering the first frame, an updated illumination time representing the time at which the light sources will illuminate for the first frame;

determine, based at least in part on the head tracking data generated by the head tracking system, an updated pose that the HMD will be in at the updated illumination time; and apply, based at least in part on the predicted pose and the updated pose, re-projection adjustments to the pixel data to obtain the first pixel data associated with the first frame.

18. The system of claim 17, wherein the one or more processors are further configured to:

determine a first amount of time the application spent rendering the preceding frame; and determine, based at least in part on the first amount of time, a predicted render time representing an amount of time the application will spend rendering the first frame, wherein the predicted illumination time is determined based at least in part on the predicted render time.

19. The system of claim 15, wherein an application that rendered the first frame is configured to target a frame rate within a range of frame rates from a minimum frame rate to a maximum frame rate, and wherein the reference frame time corresponds to an intermediate frame rate between the minimum frame rate and the maximum frame rate.

20. The system of claim 15, wherein the system is at least one of a virtual reality (VR) display system or an augmented reality (AR) display system.

\* \* \* \* \*